July 14, 1953    J. H. THORNBERY    2,645,238
SAFETY CONTROL DEVICE
Filed March 10, 1947    2 Sheets-Sheet 1
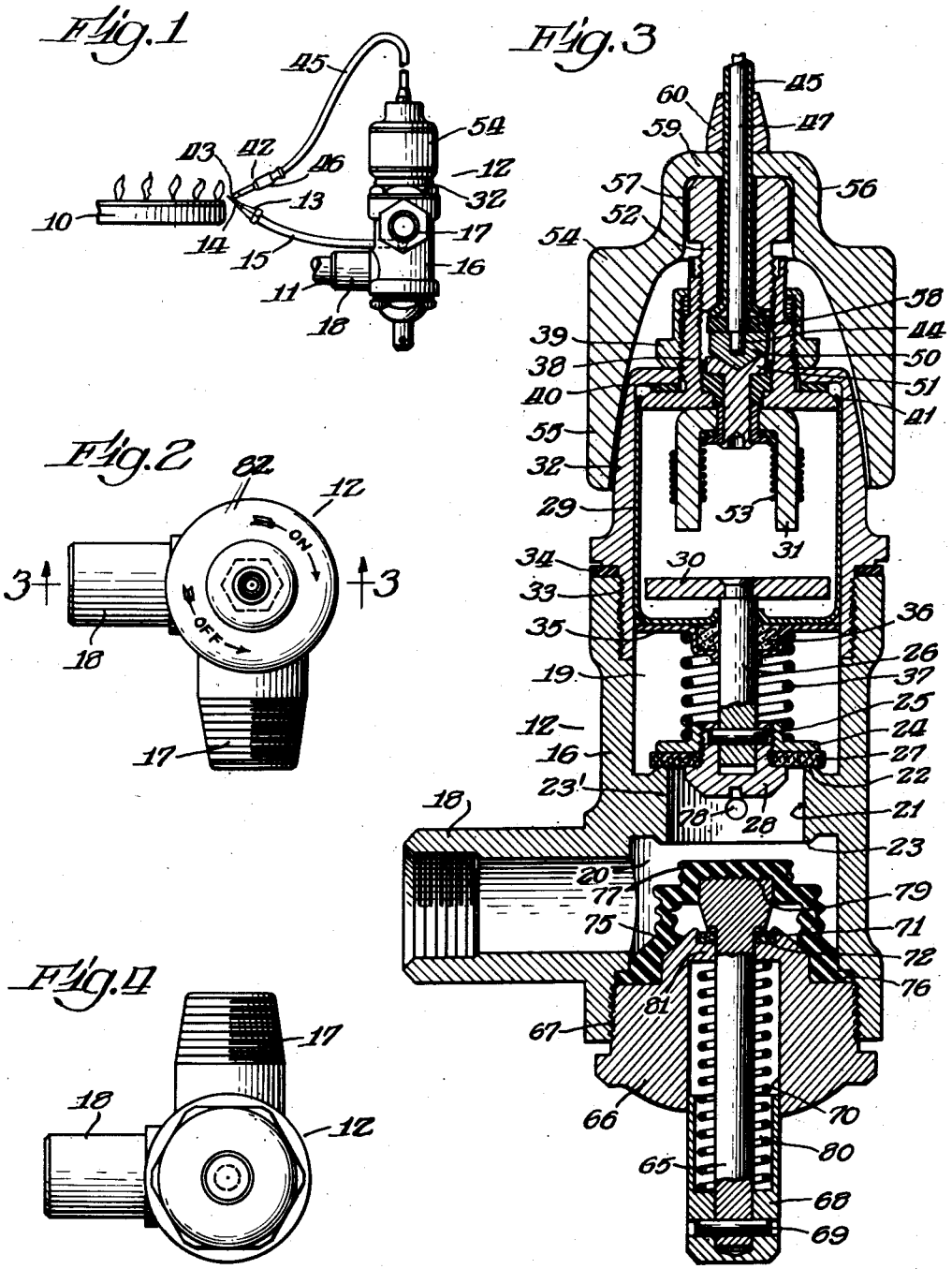
Inventor:
John H. Thornbery

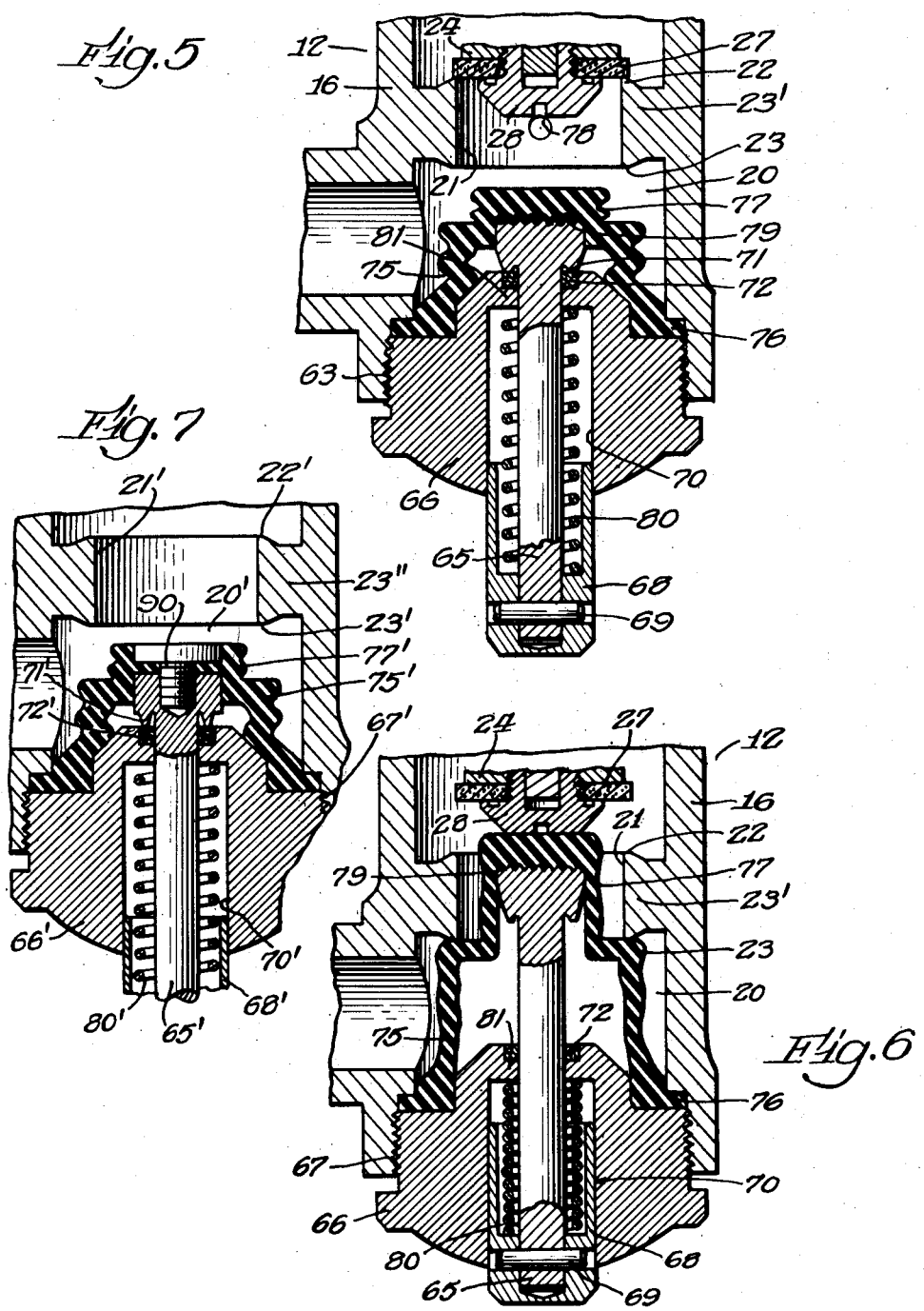

Patented July 14, 1953

2,645,238

UNITED STATES PATENT OFFICE 2,645,238

SAFETY CONTROL DEVICE

John H. Thornbery, Whitefish Bay, Wis., assignor to Milwaukee Gas Specialty Company, Milwaukee, Wis., a corporation of Wisconsin Application March 10, 1947, Serial No. 733,505

10 Claims. (Cl. 137—66)

This invention relates, in general, to safety control devices, and has particular relation to safety control devices which have a shut-off valve or the like, means for holding the shut-off valve in open position as long as a flame, such as a pilot flame, is burning, and means subject to the heat of the flame and which, by functioning or failing to function when the flame is extinguished, releases the shut-off valve for operation to closed position.

While the particular device which I shall describe hereinafter in connection with the drawings is a thermocouple safety shutoff device in which an armature, connected to the shut-off valve, is held in attracted position with the shut-off valve in open position by an electromagnet connected in circuit with a thermocouple subject to the heat of the flame, it is to be understood that the invention is not limited to such devices but may be employed in other types of safety shut-off or control devices.

Due to the inability of the means for holding the shut-off valve in open position to actuate the shut-off valve to open position, safety shut-off devices of the type to which this invention particularly appertains usually require reset or cocking means for resetting the shut-off valve to open position. This is so in the case of a thermocouple safety shut-off valve wherein the power generating ability of the heat of a pilot light or other flame on the thermocouple or other thermoelectric generator is unable to energize the electromagnet sufficiently to actuate the shut-off valve to open position.

Unless flow interrupter means is provided for assuring that the supply of fuel to the burner is shut off during the resetting operation and until the pilot light is lighted and has heated, for example, the thermocouple sufficiently to hold the shut-off valve in open position, fuel may pass to the burner and collect unburned. This unburned fuel presents the danger of burning the operator's hand; also the danger of possible explosion or asphyxiation when a flame is applied to light the pilot burner.

Applicant's prior Patent No. 2,183,827, patented December 19, 1939, and the prior patent of Charles V. Hildebrecht, No. 2,114,446, patented April 19, 1938, disclose and cover reset means with flow interrupter means for shutting off the supply of fuel to the burner during the resetting operation, which have been found to be highly satisfactory in commercial use.

One of the main objects of the present invention is to provide, in conjunction with the reset means of the class described, a new form of flow interrupter for shutting off the supply of fuel to the burner during the resetting operation.

Another object of the invention is to provide a new form of flow interrupter having various features of novelty and various advantages and which is particularly characterized by its simplicity in construction, its relatively few parts, its economy in manufacture, and its effectiveness in use.

Another and more specific object of the invention is to provide a flow interrupter comprising a rubber or rubber-like bellows, and particularly a one-piece bellows of this character arranged for cooperation with the reset means and adapted to be stretched or extended by the resetting operation of the reset means into cooperation with a valve seat to shut off the supply of fuel to the burner during the resetting operation.

Another object of the invention is to provide a flow interrupter of the class described and which is arranged so that it may perform the additional function of sealing the valve body against the escape of fuel outwardly along the reset means.

Further objects and advantages of the invention will be apparent from the following detailed description taken in connection with the accompanying drawings, in which:

Figure 1 is a fragmentary and more or less diagrammatic view showing a safety shut-off device embodying the present invention in a fuel supply system for a main burner and a pilot burner;

Figure 2 is a top plan view of the safety shut-off device shown in Figure 1;

Figure 3 is a sectional view through the safety shut-off device, taken substantially on the line 3—3 of Figure 2;

Figure 4 is a bottom plan view of the safety shut-off device shown in Figure 1;

Figure 5 is an enlarged fragmentary sectional view showing in detail the reset means and the flow interrupter means, with the reset means in retracted position and the flow interrupter means in open position;

Figure 6 is an enlarged fragmentary sectional view similar to Figure 5, with the reset means in projected or resetting position and the flow interrupter means in extended or closed position shutting off the supply of fuel to the main burner; and Figure 7 is an enlarged fragmentary sectional view similar to Figures 5 and 6 and showing a modified correlation between the reset means and the flow interrupter means.

Referring to the drawings, the burner 10 is any suitable or preferred main burner, for example, for an oven, room, or space heater, water heater, floor furnace, oven burner, top burner or any other burner.

The main burner 10 is supplied with fuel by a pipe 11 which is connected to the burner through the interior of the safety shutoff valve, designated in its entirety at 12. Where the burner 10 is a gas burner, the fuel supply pipe 11 is preferably connected to the burner through a suitable air and gas admixture chamber and fuel delivery nozzle at the burner (not shown), as well understood in the art.

Figure 1 shows a pilot burner 13 in juxtaposition to the main burner 10. The pilot burner 13 is adapted to provide a pilot light 14 for lighting the main burner. A fuel supply pipe 15 connected, for example, to the safety shutoff valve 12 or to the fuel supply line otherwise as desired, supplies gaseous fuel to the pilot burner 13.

The safety shutoff valve 12 is, in general, of the type shown in the prior patent of Clarence Wantz No. 2,307,871, patented January 12, 1943. It comprises a valve body 16 having an inlet 17 and an outlet 18. Contiguous sections of the pipe 11 are connected to the inlet 17 and outlet 18. The inlet 17 opens into an inlet chamber 19, and the outlet 18 opens from an outlet chamber 20. A port or passage 21 provides for communication between the inlet chamber 19 and the outlet chamber 20. Valve seats 22 and 23 are provided on the partition 23' through which the port 21 opens; one of these valve seats 22 surrounding one end of the port 21, and the other valve seat 23 surrounding the other end of this port.

The safety shutoff valve or flow controlling member 24 is fixed, for example, by a pin 25 upon the inner end of the valve stem 26, preferably for some relative movement thereon so as to have self-accommodating seating engagement with the cooperating seat 22. The valve member 24 is preferably provided with a valve gasket or yielding valve facing 27 secured in place by a screw 28, or in any other suitable manner, and adapted to engage the valve seat 22 when the safety shutoff valve is closed.

The valve stem 26 extends outwardly for reciprocatory movement through an opening in the inner end of a magnet and armature housing 29. The armature 30 is secured to the outer end of the valve stem 26 preferably sufficiently loosely to permit self-accommodation of the armature to the pole ends of the magnet frame 31. The stem 26 is disposed generally concentrically of the housing 29, and the armature and magnet frame are disposed within this housing. The housing 29 fits telescopically in a cap or hood 32, which, for example, is screwed at 33 into the valve body 16 preferably with a sealing gasket 34 therebetween. A valve spring seating member 35 abuts the inner end of the housing 29, and packing is preferably interposed therebetween at 36. The valve spring 37 is in the form of a coiled compression spring interposed between the safety shutoff valve member 24 and the seating member 35.

The magnet frame 31 is secured to a terminal bushing 38. The shank of the bushing 38 extends through an opening in the outer end of the cap 32 and is externally threaded for threaded engagement with a nut 39 by means of which the bushing 38 is clamped to the outer end of the cap 32. A sealing gasket 40 is preferably interposed between the headed inner end of the bushing 38 and the outer end of the cap 32. The outer end of the housing 29 is peened, for example, at 41 over the flanged or headed inner end of the bushing 38.

In the illustrated embodiment of the invention a thermocouple, indicated at 42, is positioned so that the hot junction 43 thereof will be heated by the pilot flame 14 as long as the pilot flame is burning. The thermocouple and leads therefor selected for illustration may be similar to the thermocouple and leads more fully disclosed in Oscar J. Leins Patent No. 2,126,564, patented August 9, 1938, or the thermocouple and leads may be of any other suitable or preferred form.

For the purpose of the present description, suffice it to state that the particular thermocouple selected for illustration comprises an outer tubular metallic thermocouple element and an inner metallic thermocouple element of different thermoelectric characteristics. The inner thermocouple element is joined at one end to the outer end of the outer thermocouple element to form the thermojunction 43 which is placed in position to be heated by the pilot flame 14. An inner lead conductor 44 is joined to the inner thermocouple element to form an internal thermojunction, and an outer tubular lead conductor 45 surrounds the inner lead conductor and is connected to the outer thermocouple element, for example, through a sleeve 46 to form a third thermojunction. The inner lead conductor 44 is insulated from the outer lead conductor 45, for example, by a wrapping of insulation 47 on the inner lead conductor.

A quick detachable or removable connection and manual release feature are preferably provided between the electromagnet of the safety shutoff device and the ends of the leads 44 and 45 opposite the ends which are connected to the thermocouple elements. To this end the inner lead conductor 44 is provided with a connector or terminal cone 50 as shown in Figure 3. The cone 50 seats in a correspondingly recessed outer end of a terminal tip 51 and is clamped in contact therewith by a connector sleeve 52. The adjacent end of the outer tubular lead conductor 45 is connected in circuit with one side of the coil 53 through the connector sleeve 52 and bushing 38. The other side of the coil 53 is connected to the terminal tip 51, the parts being suitably insulated as shown. The coil 53 is wound around the legs of the magnet frame 31 which, with the coil 53, constitutes the electromagnet of the device shown in the drawings.

The cap 54 has an annular flange 55 which surrounds the terminal connection and the adjacent end of the cap 32. The outer end of the cap 54 is of reduced diameter at 56 and has internal splined or keyed engagement at 57 with the outer end of the connector sleeve 52 which is screwed into the outer end of the bushing 38. The end of the outer tubular lead conductor 45 is peened over the inner end of the connector sleeve 52 and insulated from the connector cone 50 by insulating at 58. The outer end of the reduced diameter part 56 of the cap 54 has an end wall or flange 59 provided with an axial opening through which the lead conductors extend. The end wall or flange 59 is fixed between the outer end of the connector sleeve 52 and a collar or abutment member 60 fixed on the tubular lead conductor.

For the purpose of resetting the valve 24 to open position and the armature 30 to attracted position, reset stem 65 is mounted for reciprocatory movement axially in a closure member 66. The member 66 is screwed into an opening 67 extending from the interior of the valve body 16 in alignment with the port 21 and valve 24. A reset button 68 is secured to the outer end of the stem 65, for example, by a pin 69. The button 68 has sliding movement in an opening 70 in the member 66.

The inner end of the stem 65 is headed and has a valve or annular rib 71 thereon which cooperates with a leather or other suitable washer 72 to seal the valve body against leakage along the reset stem 65 when the stem is in retracted position. The valve 71 and washer 72 are shown as a precaution in the event the bellows or diaphragm, to be presently described, is ruptured. In actual practice the valve 71 and washer 72 may be omitted, and the device thereby further simplified.

The flexible bellows or bellows-like diaphragm member 75 is formed of rubber, rubber-like or other suitable material. The bellows 75 is clamped peripherally at 76 between the valve body 16 and the closure member 66 and forms an impervious covering over the inner end of the closure member 66 and the inner end of the reset stem 65, thus sealing the valve body against leakage adjacent to the closure member 66 and the stem 65. The flexible bellows 75 is shown of reduced diameter at its inner end at 77 to enter the port 71, as shown in Figure 6 when the reset stem 65 is moved inwardly to resetting position. In resetting position of the stem 65, the enlarged diameter outer portion of the bellows 75 cooperates or seats annularly on the valve seat 23, thus shutting off the supply of fuel to the main burner during the resetting operation. The reduced diameter and enlarged diameter portions of the bellows 75 may be of corrugated form as shown in the drawings, or of other suitable form.

In the illustrated embodiment of the invention the pipe 15 for supplying fuel to the pilot burner 13 is connected through a port 78 with the interior of the valve body 16 between the valve seats 22 and 23. The pilot burner 13 thus receives fuel whenever the shutoff valve 24 is open and regardless of whether the flow interrupter valve formed by the bellows 75 is open or closed. This may, of course, vary widely in so far as the present invention is concerned.

In the embodiments of the invention shown in Figures 3, 5, and 6, the portion of the bellows 75 which extends over the inner end of the reset stem 65 is secured, for example, by vulcanizing to a serrated surface 79 on the inner end of the stem 65. The reset stem 65 and button 68 may be moved to retracted or outwardly projecting position following a resetting operation by a coiled spring 80 which is shown encircling the stem 65 and interposed between the button 68 and an internal annular flange or abutment 81 on the closure member 66. I also contemplate utilizing the resilience of the rubber itself to return the reset button to its retracted position.

The annular and outwardly directed surface 82 formed on the cap 54 between the reduced and enlarged diameter portions thereof may be provided, as shown in Figure 2, with "on" and "off" markings and with arrows showing the direction in which the cap 54 should be turned to open and close the thermoelectric circuit between the thermocouple and the electromagnet. By turning the cap 54 to "on" position in the direction of the arrow adjacent to the "on" marking, the connector sleeve 52 is screwed inwardly into the bushing 38 to engage the cone 50 with the terminal tip 51, thus completing the circuit between the thermocouple and the electromagnet. By turning the cap 54 to "off" position in the direction of the arrow adjacent to the "off" marking the connector sleeve 52 is screwed outwardly from the bushing 38, thus separating the cone 50 from the terminal tip 51 and opening the circuit between the thermocouple and the electromagnet. This provides an effective manual release feature whereby the shutoff valve 24 may be closed by jacking the thermocouple attaching nut or sleeve 52 out of contact with the socketed end of the terminal tip 51.

In the embodiment of the invention shown in Figure 7, the portion of the bellows 75' which extends over the inner end of the reset stem 65' is secured to the inner end of the stem 65' by a screw 90. Otherwise the portion of the device shown in Figure 7 is similar to the corresponding portion of the preceding embodiment of the invention, and similar parts are designated by primed reference characters corresponding with the reference characters previously used.

In general, the operation of the device is similar to the operation described in the prior patents previously mentioned and, being well understood in the art, will not be described in detail. Suffice it to state that the flexible bellows 75 constitutes a flow interrupter valve which is adapted to be stretched by the resetting operation of the reset stem 65 into engagement with the cooperating valve seat 23 to shut off the flow of fuel to the burner during the resetting operation. With the bellows arranged as shown and described it also performs the additional function of sealing the device against leakage of fuel from the valve body 16 adjacent to the reset means. The cap 54, with its keyed or splined engagement with the connector sleeve 52 and its mounting against axial movement relative to the sleeve 52 provides a manual release feature whereby the shutoff valve 24 may be closed manually by merely turning the cap 54, which thereby jacks the thermocouple attaching nut or sleeve out of and into contact with the socketed end of the terminal tip 51.

The embodiments of the invention shown in the drawings are for illustrative purposes only, and it is to be expressly understood that the drawings and the accompanying specification are not to be construed as a definition of the limits or scope of the invention, reference being had to the appended claims for that purpose.

I claim:

1. In a device of the class described, in combination, a valve body having an opening circumscribed at one end by a valve seat, a reciprocatory plunger having an inner end disposed within said valve body, and a flexible bellows secured peripherally to the valve body and forming an impervious covering over the inner end of said plunger, said bellows having a valve seating portion and adapted to be stretched by depression of said plunger to seat the valve seating portion of the bellows against said valve seat to close said opening, the portion of the bellows within the area of the valve seat being adapted to be stretched by further depression of the plunger after said seating portion is seated against the valve seat.

2. A device according to claim 1 wherein the flexible bellows is secured peripherally between the valve body and a closure member and seals the joint between the valve body and the closure member.

3. A device according to claim 1 wherein the opening in the valve body is circumscribed at its opposite end by a second valve seat, and wherein there is a shut-off valve having closed position seating against said valve seat and movable to open position by the action of said bellows and plunger after the valve seating portion of the bellows is seated against its valve seat.

4. A device according to claim 1 wherein there is an electromagnet and an armature having attracted and retracted positions relative to said electromagnet, and wherein said armature is movable to attracted position by the action of said bellows and plunger after the valve seating portion of the bellows is seated against its valve seat.

5. In a device of the class wherein a valve body has an inlet and an outlet, a partition wall disposed between said inlet and outlet and having a valve passage opening through said wall, valve seats at opposite ends of said passage, shut-off valve means having biasing means for operating said shut-off valve means to closed position engaging one valve seat to shut off the flow through said outlet, a reset plunger mounted in a valve body part and having an inner end adapted to be projected inwardly and means for holding said shut-off valve in open position, the combination with said device of a flexible bellows secured peripherally to the valve body and forming an impervious covering over the inner end of the plunger and the inner end of the valve body part in which the plunger is mounted, said bellows having a valve seating portion and adapted to be stretched by depression of said plunger to seat the valve seating portion of the bellows against the other valve seat to close the valve passage, the portion of the bellows within the area of the valve passage being adapted to be stretched by further depression of the plunger after said valve seating portion is seated against the valve seat to reset said shut-off valve means to open position and to tighten the seating of the valve seating portion of said bellows against said other valve seat.

6. A device according to claim 5 wherein the valve body part in which the plunger is mounted comprises a closure member screwed into the valve body and having an opening in which the plunger is slidable axially and wherein the peripherally secured part of the bellows is clamped between said closure member and the valve body part and the bellows covers the inner end of the opening in said closure member.

7. A device according to claim 5 wherein the means for holding the shutoff valve in open position comprises an electromagnet connected in circuit with a thermoelectric generator.

8. A device according to claim 5 wherein the inner end of the reset plunger is serrated and the part of the bellows covering the inner end of the plunger is vulcanized to the serrated end of the plunger.

9. A device according to claim 5 wherein the portion of the bellows covering the inner end of the plunger is adapted to enter the passage in the partition wall in the resetting operation of the plunger and the portion of the bellows which cooperates with the other valve seat extends radially outwardly of the portion of the bellows which enters said passage.

10. In combination, a valve body having an inlet and an outlet, a partition wall disposed between said inlet and said outlet and having a flow port therethrough, a valve seat at one end of said port, a reciprocatory plunger mounted in said valve body and having an inner end adapted to be projected inwardly by depression of said plunger, and a flexible bellows secured peripherally to the valve body and forming an impervious covering over the inner end of the plunger, said bellows having a side wall adapted to be stretched by depression of said plunger and a valve seating portion adapted to be seated against said valve seat by such stretching of the side wall of the bellows, said bellows having a portion adapted by depression of said plunger to be stretched into said flow port after said valve seating portion is seated against said valve seat to tighten the seating of said valve seating portion against said valve seat.

JOHN H. THORNBERY.

References Cited in the file of this patent

UNITED STATES PATENTS

| Number | Name | Date |
|---|---|---|
| 1,658,951 | Stitt | Feb. 14, 1928 |
| 1,779,503 | Swindin | Oct. 28, 1930 |
| 2,114,446 | Hildebrecht | Apr. 19, 1938 |
| 2,118,300 | Ford | May 24, 1938 |
| 2,188,216 | Beecher | Jan. 23, 1940 |
| 2,296,322 | Alfery | Sept. 22, 1942 |
| 2,324,100 | Maynard | July 13, 1943 |
| 2,333,455 | Warren | Nov. 2, 1943 |
| 2,427,441 | Butts | Sept. 16, 1947 |
| 2,540,298 | Seng | Feb. 6, 1951 |

FOREIGN PATENTS

| Number | Country | Date |
|---|---|---|
| 2,587 | Great Britain | of 1857 |
| 603,632 | France | of 1926 |